(12) United States Patent
Ogura et al.

(10) Patent No.: US 7,348,716 B2
(45) Date of Patent: Mar. 25, 2008

(54) PIEZOELECTRIC GYRO ELEMENT AND PIEZOELECTRIC GYROSCOPE

(75) Inventors: Seiichiro Ogura, Minowa-machi (JP); Yoshihiro Kobayashi, Nagano-ken (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/296,004

(22) Filed: Dec. 6, 2005

(65) Prior Publication Data

US 2006/0226741 A1 Oct. 12, 2006

(30) Foreign Application Priority Data

Dec. 16, 2004 (JP) ............................. 2004-364978

(51) Int. Cl.
*H01L 41/08* (2006.01)

(52) U.S. Cl. ...................... 310/370; 310/365

(58) Field of Classification Search ................ 310/370, 310/365–366, 330, 329; 73/504.16, 505, 73/12, 504.14; 331/65; *H01L 41/08*
See application file for complete search history.

(56) References Cited

U.S. PATENT DOCUMENTS 5,386,726 A * 2/1995 Terajima ..................... 310/329
5,420,548 A * 5/1995 Nakajima ................... 310/370
6,561,829 B2 * 5/2003 Maeda et al. ............... 439/247
7,134,336 B2 * 11/2006 Mase et al. ............... 73/504.12

FOREIGN PATENT DOCUMENTS

JP 07-092175 4/1995
JP 08-271256 10/1996

* cited by examiner

*Primary Examiner*—Darren Schuberg
*Assistant Examiner*—Karen Addison
(74) *Attorney, Agent, or Firm*—Anderson Kill & Olick, PC

(57) ABSTRACT

A piezoelectric gyro element including: a piezoelectric vibration body, which has a shape of a rectangular column with a rectangular section, the piezoelectric vibration body being fixed on one end; first driving electrodes formed on opposing first side faces of the piezoelectric vibration body; second and third driving electrodes formed separated from each other in the width direction of opposing second side faces of the piezoelectric vibration body; first detecting electrodes formed on the opposing first side faces of the piezoelectric vibration body; and second detecting electrodes formed on the opposing second side faces of the piezoelectric vibration body; wherein the piezoelectric vibration body is made to oscillate so that one end thereof rotates in a circular path, by applying driving currents with phase differentials to each of the driving electrodes; and a bend of the piezoelectric vibration body, the bend being generated by a torque operating orthogonally to a rotational central axis of the oscillation, being output as information from the detecting electrodes.

3 Claims, 6 Drawing Sheets

PIEZOELECTRIC GYRO ELEMENT AND PIEZOELECTRIC GYROSCOPE

BACKGROUND

1. Technical Field

The present invention relates to a piezoelectric gyro element for detecting angular velocities of directions of two axes, and a piezoelectric gyroscope that uses the element.

2. Related Art

Piezoelectric gyroscopes are commonly and widely used as orientation controls or as navigation systems for vessels, aircrafts, and automobiles, etc.; angular velocity sensors for image stabilizers and stability detection or the like in video cameras, etc.; and rotation direction sensors of a three dimensional mouse, etc. Many of the common piezoelectric gyro sensors is structured so as to detect the angular velocity of a rotation within one plane, or in other words, an angular velocity in the direction of one axis. In order to detect angular velocities of the directions of two axes, it has been necessary so far to use two piezoelectric gyro sensors and arrange them orthogonally to each other.

Hence, various structures of piezoelectric gyro sensors, which can detect the angular velocities of the direction of two axes with single piezoelectric gyro sensors, are being developed and suggested. For example, a vibratory gyro, which has a cross-shaped vibratory elastic body that has two axes intercrossing at a right angle, and is provided with a oscillator that excites vibratory elastic body in a flexure vibration mode so that the phases in the direction of the two axes will be opposite to each other, is known. JP-A-8-271256 is a first example of this related art. In vibratory gyros with such structure, the size of the entire device grows larger, and the cost increases.

An angular velocity sensor, which can simultaneously detect two angular velocities with a single sensor in a simple structure, by fixing one end of the vibration material for vibration detection and making the other end rotate in a circular path, is also suggested. JP-A-7-92175 is a second example of the related art. This angular velocity sensor has a pair of piezoelectric bodies and a pair of electrodes that are respectively adhered on each side face of the flexible, columnar vibration material. The free end of the sensor's vibration material performs a rotation (a circular motion), by being oscillated with driving output signals that are 90 degrees apart from each other phase-wise. The angular velocities are detected by utilizing the Coriolis force generated by an external force that is activated during the motion.

However, in the angular velocity sensor as described in the second example of related art, it is not the vibration material itself that shrinks and expands, but the sheet piezoelectric body adhered on its side face, and thereby the vibration material oscillates. This involves a problem that oscillation loss may occur depending on the adhesive status of the piezoelectric body, resulting in a decline in drive efficiency. Moreover, if the oscillation takes place in a high frequency, the piezoelectric body may flake off the surface of the vibration material, causing the detection sensitivity to drop significantly, or possibly to be lost entirely. These problems can be eliminated by altering the vibration material with a piezoelectric material. However, taking into account the structure of the driving electrode in common angular velocity sensors, it is not possible to make vibration material made of piezoelectric material rotate in a circular path, in a mechanism similar to the one described above.

SUMMARY

The advantage of the invention is to provide a piezoelectric gyro element and a piezoelectric gyroscope, which allow to reduce the size of the element, as well as to cut down its manufacturing cost, having relatively simple structure with rectangular columnar vibration body made of piezoelectric material, and which can detect angular velocities of the direction of two axes simultaneously, in a high driving efficiency, and in a high precision.

According to an aspect of the invention, a piezoelectric gyro element including: a piezoelectric vibration body, which has a shape of a rectangular column with a rectangular section, the piezoelectric vibration body being fixed on one end; first driving electrodes formed on opposing first side faces of the piezoelectric vibration body; second and third driving electrodes formed separated from each other in the width direction of opposing second side faces of the piezoelectric vibration body; first detecting electrodes formed on the opposing first side faces of the piezoelectric vibration body; and second detecting electrodes formed on the opposing second side faces of the piezoelectric vibration body; wherein the piezoelectric vibration body is made to oscillate so that one end thereof rotates in a circular path, by applying driving currents with phase differentials to each of the driving electrodes; and a bend of the piezoelectric vibration body, the bend being generated by a torque operating orthogonally to a rotational central axis of the oscillation, being output as information from the detecting electrodes, is provided.

The desired circular motion can be generated in the piezoelectric vibration body itself, by applying the three-phased driving signals, each having a different phase, to the first through third driving electrodes, allowing the detection with a high precision in a high driving efficiency. Moreover, the structure can be made simple; the number of parts can be reduced, and so can the cost. At the same time, the size of a piezoelectric gyroscope can also be reduced. Further, the design is highly flexible, since the flaking problem does not occur even if the oscillation frequency is high, unlike the common technique. Particularly, if the piezoelectric vibration body is formed with crystal, its outer shape can be processed by performing wet etching, and each electrode can be formed by a vapor deposition, allowing its production in a high processing precision.

In this case, fourth driving electrodes formed on the opposing second side faces of the piezoelectric vibration body, by parting the second and the third driving electrodes in the width direction, may be further included. Here, the piezoelectric vibration body can control its oscillation in a higher precision, by applying the four-phased driving signals, each having a different phase, to the first through fourth driving electrodes, and can generate a desired circular motion.

According to another aspect of the invention, a piezoelectric gyroscope, including: the above-mentioned piezoelectric gyro element; a driving circuit for applying a driving signal to each of the driving electrodes of the piezoelectric gyro element; and a detecting circuit which detects the output from each of the detecting electrodes; can be provided, with a simpler structure, allowing the size and the manufacturing cost to be reduced.

DESCRIPTION OF EXEMPLARY EMBODIMENTS

Embodiments of the invention will now be described in detail with reference to the attached illustrations.

Figure 1A:
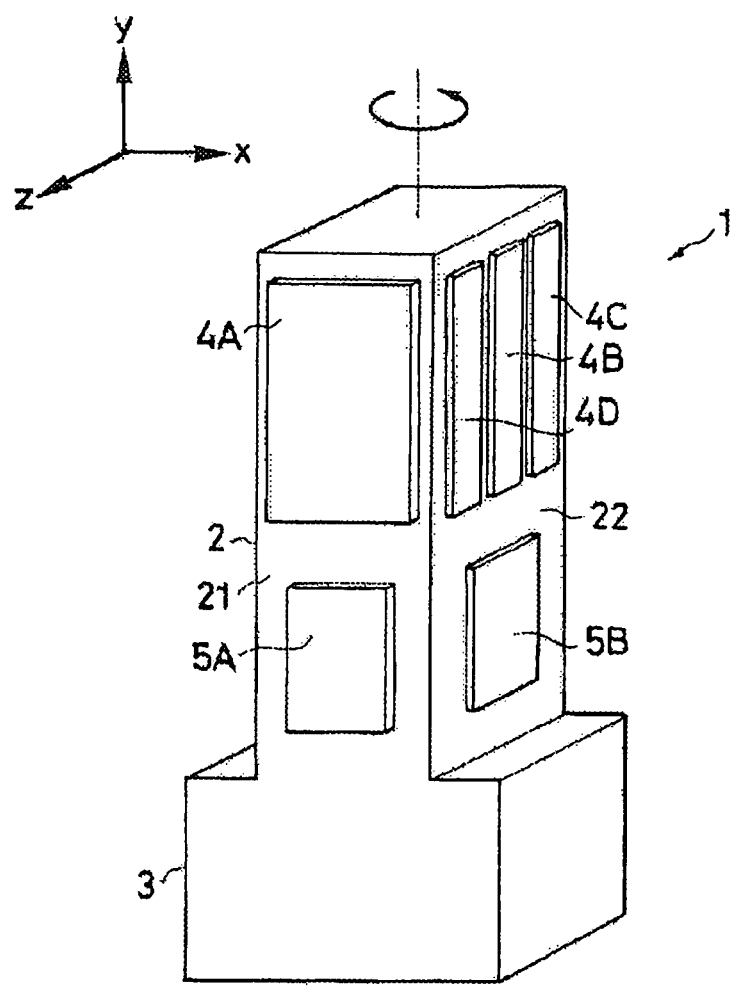
FIG. 1A is a schematic oblique illustration showing a piezoelectric gyro element according to a first embodiment of the invention.

FIG. 1A schematically illustrates a piezoelectric gyro element according to a first embodiment of the invention. A piezoelectric gyro element 1 includes a piezoelectric vibrating body 2 that has a shape of rectangular column with a square section, and a base 3 formed on its one end as a one part thereof. At the time of use, the piezoelectric gyro element 1 is fixed at the base 3, and is held in a way that allows the other end of the piezoelectric vibrating body 2 to oscillate as a free end.

The piezoelectric gyro element 1 in the first embodiment is composed of crystal, and can easily be processed to have a prescribed outer shape by, for instance, performing wet etching on a crystal wafer with an appropriate thickness. Particularly in the first embodiment, a crystal wafer (so called a z-plate), which is sliced out at the face that is orthogonal to the z-axis of the crystallographic axis of the crystal, is used, in order to match the central axis of the piezoelectric vibrating body 2 with the y-axis of the crystallographic axis of the crystal.

Opposing side faces 21 are on the face z that is orthogonal to the z-axis of the piezoelectric vibrating body 2. A pair of first driving electrodes 4A is formed in a position that faces each other, on the side faces 21 of the piezoelectric vibrating body 2, along its lengthwise direction at the side of the free end. Opposing side faces 22 are on the face x that is orthogonal to the x-axis of the piezoelectric vibrating body 2. Pairs of second through fourth driving electrodes 4B through 4D are formed on the side faces 22 of the piezoelectric vibrating body 2, one of each pair on one of the side faces 22, along its lengthwise direction at the side of the free end. The second through fourth driving electrodes 4B through 4D are slightly separated from each other in the width direction of each side face 22, and arranged so that the second driving electrodes 4B in the center face each other, and that, on both their respective sides, the third driving electrodes 4C and the fourth driving electrodes 4D face each other.

Moreover, a pair of first detecting electrodes 5A is formed in a opposing positions, on the opposing side faces 21 of the piezoelectric vibrating body 2, along its lengthwise direction at the side of the base 3. Similarly, a pair of first detecting electrodes 5A is formed in a opposing positions, on the opposing side faces 22 of the piezoelectric vibrating body 2, along its lengthwise direction at the side of the base 3.

A driving circuit (described later) is connected on each of the driving electrodes of the piezoelectric gyro element 1, and a detecting circuit is connected to the detecting electrodes. Hence, the piezoelectric gyroscope according to the embodiment of the invention can be implemented.

Figure 2:
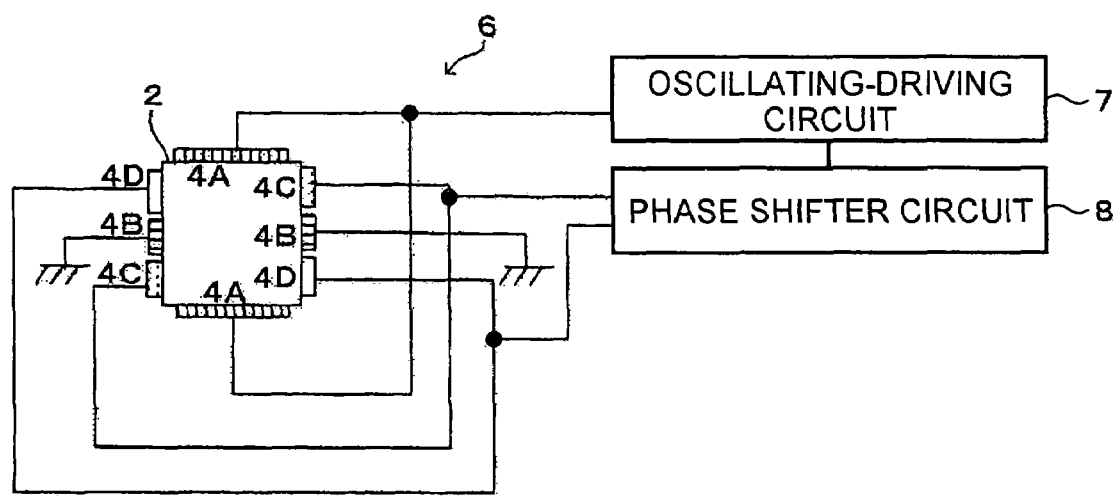
FIG. 2 is a block diagram of the piezoelectric vibrating body of the piezoelectric gyro element in FIG. 1, and its driving circuit.
Figure 3A:
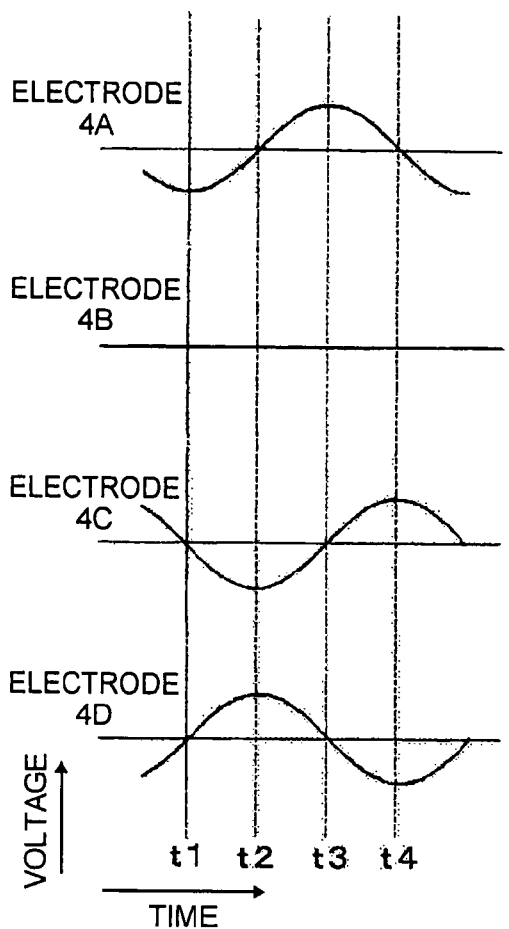
FIG. 3A is a graph showing a drive signal applied from the driving circuit in FIG. 2, and FIGS. 3B1 through 3B4 are explanatory illustrations showing the vibration of the piezoelectric vibrating body oscillated by the drive signal shown in FIG. 3A.
Figures 1, 3B:
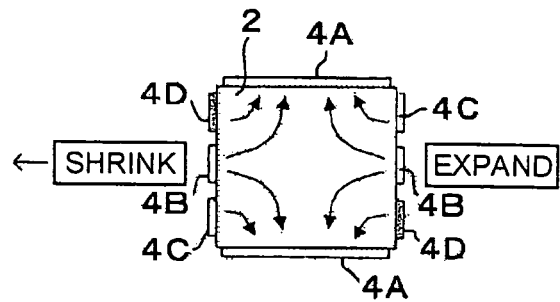
Figures 2, 3B:
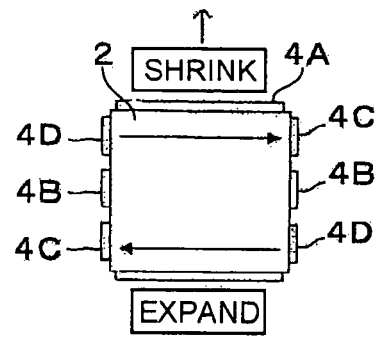

FIG. 2 illustrates an example of a structure of the driving circuit used in the piezoelectric gyro element shown in FIG. 1. A driving circuit 6 includes an oscillating-driving circuit 7 and a phase shifter circuit 8. The first driving electrodes 4A are directly connected to the oscillating-driving circuit 7. The third driving electrodes 4C and the fourth driving electrodes 4D are connected to the oscillating-driving circuit 7 via the phase shifter circuit 8. The second driving electrodes 4B are grounded.

In the first embodiment, driving signals as shown in FIG. 3A are applied to each of the driving electrodes using the driving circuit referred to in FIG. 2, so as to oscillate the piezoelectric vibration body 2. As shown in FIG. 3A, the phase of the driving signal for the third driving electrode 4C is equivalent to the phase of the driving signal for the fourth driving electrode 4D, shifted by 180 degrees. The phase of the driving signal for the first driving electrode 4A is equivalent to the phase of the driving signal for the third driving electrode 4C shifted by 90 degrees. The value of driving signal of the second driving electrode 4B is constantly 0, since it is grounded as described above.

When each driving signal is applied as described, at the time t1 in FIG. 3A, electric fields, which flow from each of the second to fourth driving electrodes 4B through 4D to their adjacent first driving electrodes 4A in the piezoelectric vibrating body 2, as shown with arrows in FIG. 3B1, emerge. As a result, the piezoelectric vibration body 2 bends to the left side of the illustration, since the left-side face of the side faces 22 in the illustration shrinks and the right-side face of the side faces 22 expands. At the time t2, only the electric fields, which flow from each of the fourth driving electrodes 4D to each of the third driving electrodes 4C, emerge. As a result, the piezoelectric vibration body 2 bends to the upper side of the illustration, since the upper-side face of the side faces 21 in the illustration shrinks and the lower-side face of the side faces 21 expands. At the time t3, the electric fields, which flow from the first driving electrodes 4A to each of the adjacent second to fourth driving electrodes 4B through 4D, emerge. As a result, the piezoelectric vibration body 2 bends to the right side of the illustration, since the right-side face of the side faces 22 in the illustration shrinks and the left-side face of the side faces 22 expands. At the time t4, only the electric fields, which flow from each of the third driving electrodes 4C to each of the fourth driving electrodes 4D, emerge. As a result, the piezoelectric vibration body 2 bends to the lower side of the illustration, since the lower-side face of the side faces 21 in the illustration shrinks and the upper-side face of the side faces 21 expands.

Consequently, the piezoelectric vibration body 2 oscillates in a way to sequentially shrink and expand in the directions of x-axis and z-axis, in accordance with the change of the driving signals. By controlling its amplitude to be constant, a center O of the free end of the piezoelectric vibration body 2 draws a locus shown in a solid line in FIG. 1B, and rotates in a circular path, having the y-axis as a center.

Figure 1B:
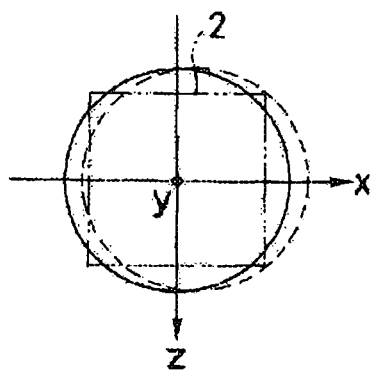
FIG. 1B is an explanatory drawing showing a locus of a free end of a piezoelectric vibrating body that rotates in a circular path.

If a torque operates in the direction of the y-axis of the piezoelectric vibration body 2 (the direction that is orthogonal to the rotational central axis) in the state of rotation with the y-axis as a center, a precession, in which the rotational central axis rotates in a direction that is 90 degrees from the direction of that torque's operational power, occurs. As a result, the locus of the center O of the free end of the piezoelectric vibration body 2 shifts as shown in FIG. 1B with a dotted line. In the gyroscope according to the embodiments of the invention, the changes of the shrinkage and expansion of the piezoelectric vibration body 2, generated by the shift in the circular motion, are output as a voltage variation between the electrodes from the first and the second detecting electrodes 5A and 5B; thereby detecting an angular velocity.

Figure 4A:
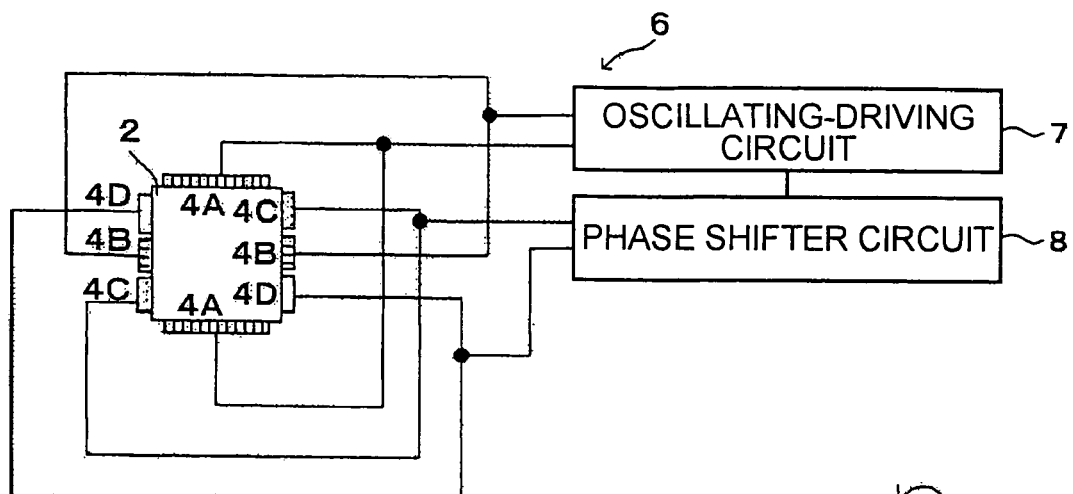

FIG. 4A illustrates another structure of the driving circuit used in the piezoelectric gyro element shown in FIG. 1. In the driving circuit 6 in another structure of the first embodiment, the first driving electrodes 4A and the second driving electrodes 4B are directly connected to the oscillating-driving circuit 7. The third driving electrodes 4C and the fourth driving electrodes 4D are connected to the oscillating-driving circuit 7 via the phase shifter circuit 8, as in the previous structure.

Figure 4B:
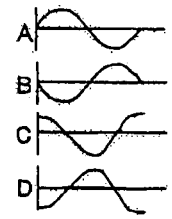

In the driving circuit 6 with such structure, the driving signals as shown in FIG. 4B are applied to each of the driving electrodes, so as to oscillate the piezoelectric vibration body 2. As shown in FIG. 4B, the phase of the driving signal for the first driving electrode 4A is equivalent to the phase of the driving signal for the second driving electrode 4B, shifted by 180 degrees. Similarly, the phase of the driving signal for the third driving electrode 4C is equivalent to the phase of the driving signal for the fourth driving electrode 4D, shifted by 180 degrees. Between the first driving electrode 4A and the third driving electrode 4C, the phase shift is 90 degrees.

The application of such driving signals allows, in a mechanism similar to the one described above, the piezoelectric vibration body 2 to oscillate so that its free end rotates in a circular path. In the above-referenced embodiment, the piezoelectric vibration body 2 can be made to oscillate efficiently with a smaller amount of drive current, when compared to the case of grounding the second driving electrodes 4B.

Figure 5A:
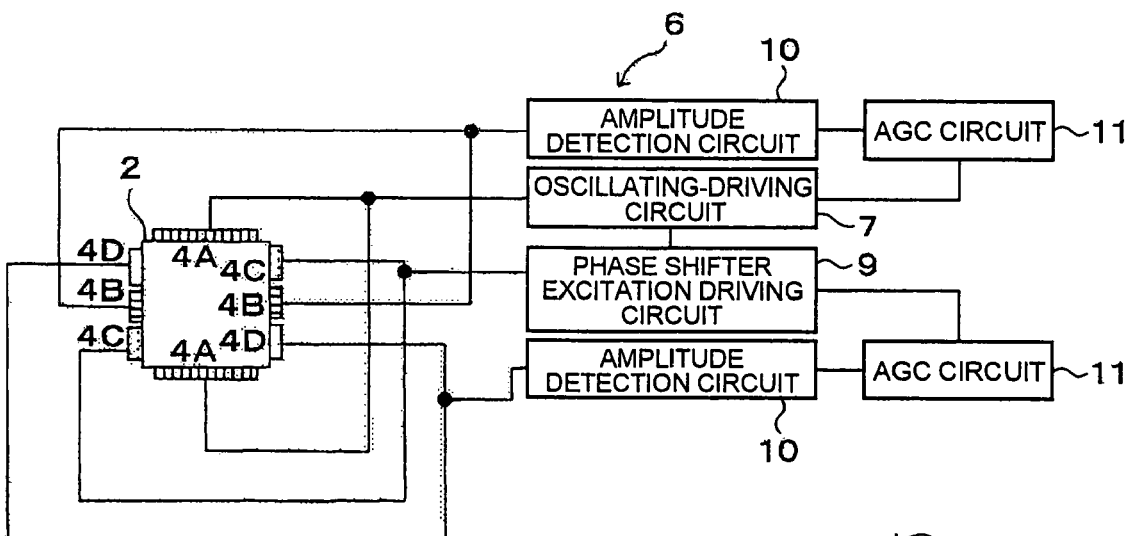
FIG. 5A is a block diagram showing still another driving circuit of the piezoelectric gyro element in FIG. 1.

FIG. 5 illustrates still another structure of the driving circuit used in the piezoelectric gyro element shown in FIG. 1. The driving circuit 6 in this structure of the first embodiment includes a phase shifter excitation driving circuit 9 instead of the phase shifter circuit 8 referred to in FIG. 2, and an amplitude detection circuit 10 and an auto gain control (AGC) circuit 11. The first driving electrodes 4A are directly connected to the oscillating-driving circuit 7, as in the previous structure. The second driving electrodes 4B are connected to the oscillating-driving circuit 7 via the amplitude detection circuit 10 and the AGC circuit 11. The third driving electrodes 4C are connected to the oscillating-driving circuit 7 via the phase shifter excitation driving circuit 9. The fourth driving electrodes 4D are connected to the oscillating-driving circuit 7 via the amplitude detection circuit 10, the AGC circuit 11, and the phase shifter excitation driving circuit 9.

Figure 5B:
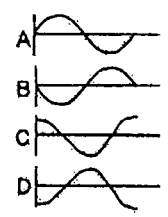
FIG. 5B is a graph showing its driving signals.

In the driving circuit 6 with such structure, the driving signals as shown in FIG. 5B are applied to each of the driving electrodes, so as to oscillate the piezoelectric vibration body 2. The driving signals referred to in FIG. 5B are the same as what are referred to in FIG. 4B. Hence, in a mechanism similar to the one described above, the piezoelectric vibration body 2 can be made to oscillate so that its free end rotates in a circular path. In the embodiment referred to above, installing the AGC circuit 11 allows a stabilization of the strength of each driving signal.

Figure 6A:
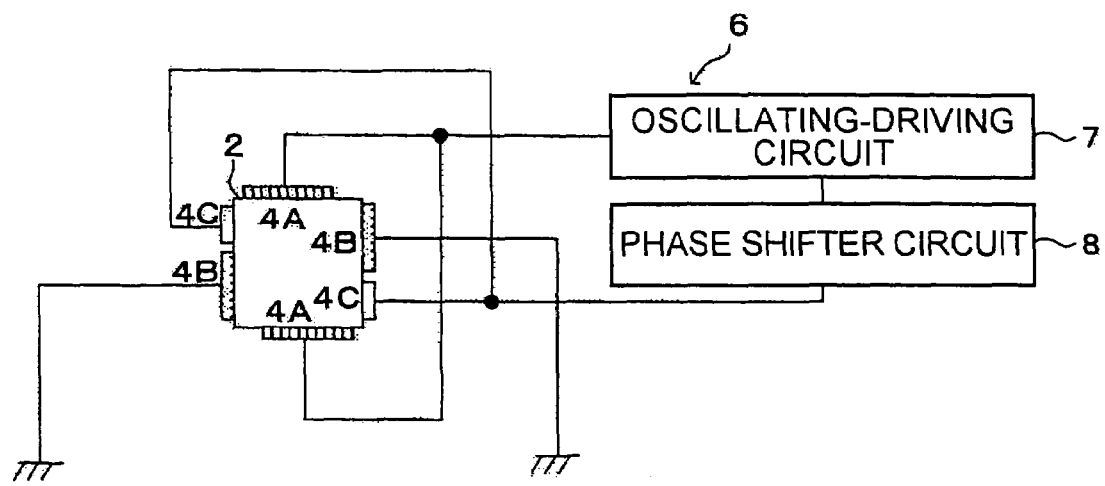
FIG. 6A is a block diagram showing a piezoelectric vibrating body of a piezoelectric gyro element according to a second embodiment of the invention.

FIG. 6A illustrates the piezoelectric gyro element and its driving circuit according to a second embodiment of the invention. The piezoelectric vibration body 2, according to the second embodiment of the invention, omits the fourth driving electrode 4D referred to in the first embodiment, simplifying the structures of the driving electrode and of the driving circuit used therein. In the driving circuit 6 according to the second embodiment, the first driving electrodes 4A are, similar to the driving circuit in FIG. 2, directly connected to the oscillating-driving circuit 7. The third driving electrodes 4C and the fourth driving electrodes 4D are connected to the oscillating-driving circuit 7 via the phase shifter circuit 8, and the second driving electrodes 4B are grounded.

Figures 3, 3B:
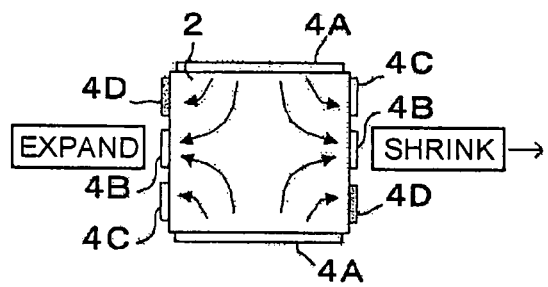
Figures 3, 3B, 4:
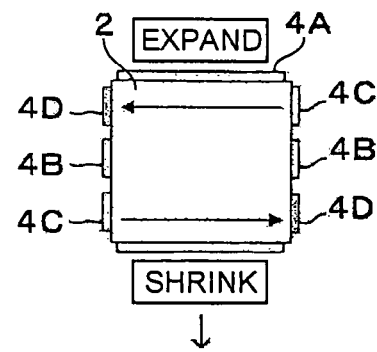
FIG. 4A is a block diagram showing another driving circuit of the piezoelectric gyro element in FIG. 1.
FIG. 4B is a graph showing its driving signals.
Figure 6B:
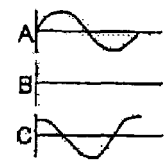
FIG. 6B is a graph showing its driving signals.

In the second embodiment, the driving signals as shown in FIG. 6B are applied to each of the driving electrodes, so as to oscillate the piezoelectric vibration body 2. As shown in FIG. 6B, the phase of the driving signal of the first driving electrode 4A is equivalent to the phase of the third driving electrode 4C shifted by 90 degrees. The driving signal of the second driving electrode 4B is constantly 0, since it is grounded. Consequently, an oscillation, similar to the one described above in reference to FIG. 3, can be generated in the piezoelectric vibration body 2, and its free end can rotate in a circular path.

Moreover, in the second embodiment, the connection for the first driving electrodes 4A and for the third driving electrodes 4C can be reversed. In this embodiment, it is basically desirable that the driving electrode, with a larger resonance value Q, be connected to the oscillating-driving circuit, in order to make the electrode oscillate, and a phase of the driving electrode, which has a smaller resonance value Q, be shifted by 90 degrees. This is because the larger the resonance value Q is, more stable the obtained oscillation become; hence favorable temperature and frequency characteristics can be obtained.

Figure 7A:
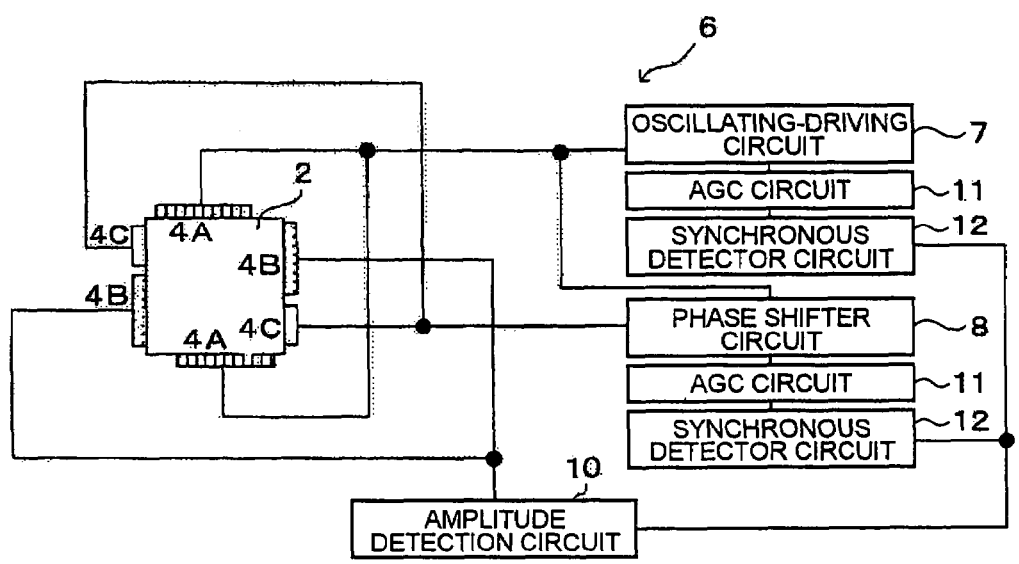
FIG. 7A is a block diagram showing another driving circuit of the piezoelectric gyro element according to the second embodiment.
Figure 7B:
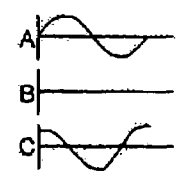
FIG. 7B is a graph showing its driving signals.

FIG. 7 illustrates another structure of the driving circuit used in the piezoelectric gyro element according to the second embodiment. The driving circuit 6 in another structure of the second embodiment includes the amplitude detection circuit 10, the AGC circuit 11, and further, a synchronous detector circuit 12. The first driving electrodes 4A are directly connected to the oscillating-driving circuit 7, as in the previous structure. The second driving electrodes 4B are connected to the oscillating-driving circuit 7 via the amplitude detection circuit 10, the synchronous detector circuit 12, and the AGC circuit 11. The third driving electrodes 4C are connected to the oscillating-driving circuit 7 via the amplitude detection circuit 8, the AGC circuit 11, and the synchronous detector circuit 12.

With this driving circuit 6, the driving signals similar to the ones in FIG. 6B are applied to each of the driving electrodes, so as to oscillate the piezoelectric vibration body 2; thus, the piezoelectric vibration body 2 can be made to oscillate so that its free end rotates in a circular path. In the above-referenced embodiment, installing the AGC circuit 11 allows the stabilization of the strength of each driving signal.

Figure 8:
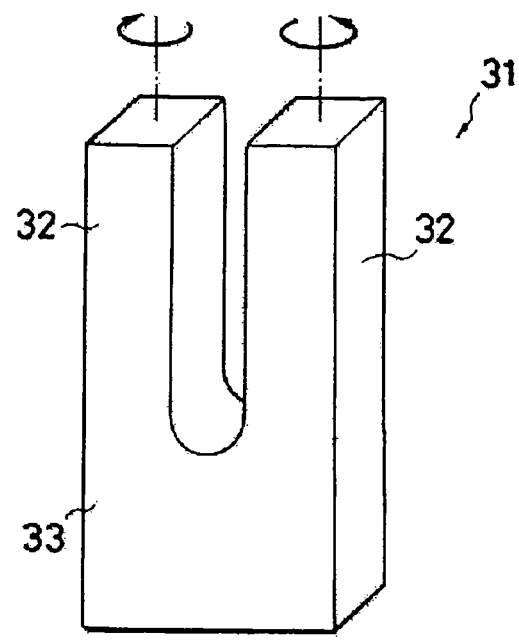
FIG. 8 is a schematic oblique illustration showing a different configuration of the piezoelectric gyro element according to embodiments of the invention.

FIG. 8 illustrates a different configuration of the piezoelectric gyro element according to the embodiments of the invention. A piezoelectric gyro element 31 in FIG. 8 has a structure of a tuning fork, where two piezoelectric vibration bodies 32 are extended in parallel from a base 33. Each of the piezoelectric vibration bodies 32 has the same structure described above, as shown in FIGS. 1 and 6. In this embodiment, free ends of each of the piezoelectric vibration bodies 32 rotate in a circular path in a direction opposite from each other. As a result, the vibrations counter each other off at the base 33, of which the effect is a benefit of smaller vibration leak.

Figure 9:
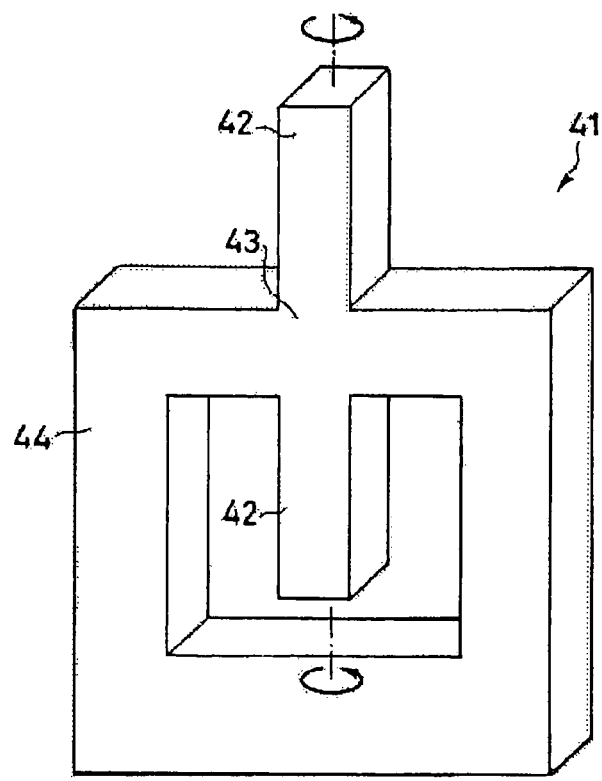
FIG. 9 is a schematic oblique illustration showing another different configuration of the piezoelectric gyro element according to embodiments of the invention.

FIG. 9 illustrates a different configuration of the piezoelectric gyro element according to the embodiments of the invention. A piezoelectric gyro element 41 in FIG. 9 has a structure, in which two piezoelectric vibration bodies 42 are extended from a base 43 straight in the opposite direction from each other, and the base 43 is supported and fixed with a frame 44. Each of the piezoelectric vibration bodies 42 has the same structure as described above as shown in FIGS. 1 and 6. In this embodiment, free ends of each of the piezoelectric vibration bodies 42 rotate in a circular path in a same direction. In this case, the vibrations counter each other off at the base 43, of which the effect is a benefit of smaller vibration leak.

As described, the embodiments of the invention have been explained in detail. However, the invention can be embodied by adding various variant and modifications to the aforementioned embodiments. For example, in the aforementioned embodiments, the piezoelectric gyro element is formed with crystal. However, a piezoelectric material commonly used in a various piezoelectric devices can similarly be used. Moreover, the piezoelectric vibration bodies in the above embodiments are formed in a shape of rectangular column with a square section. However, in other embodiments, they can also be formed in shapes of rectangular columns with rectangular sections. In such cases, a similar circular motion (as that of the column with a square section) can be attained by adjusting the amplitude of the driving signal applied to each driving electrode, so that the drive forces of the x-axis and y-axis will be the equal. Furthermore, by adding a spindle on the free end of the piezoelectric vibration body, as in the case of the tuning-fork-shaped piezoelectric oscillator, an oscillation amplitude is increased by the spindle's momentum, resulting in an increase of detection efficiency.

The entire disclosure of Japanese Patent Application No. 2004-364978, filed Dec. 16, 2004 is expressed incorporated by reference herein.

What is claimed is:

1. A piezoelectric gyro element for detecting angular velocities of directions of two axes comprising:
    a piezoelectric vibration body, which has a shape of a rectangular column with a rectangular section, the piezoelectric vibration body being fixed on one end;
    first driving electrodes formed on opposing first side faces of the piezoelectric vibration body;
    second and third driving electrodes formed separated from each other in the width direction of opposing second side faces of the piezoelectric vibration body;
    first pair of detecting electrodes formed on the opposing first side faces of the piezoelectric vibration body; and
    second pair of detecting electrodes formed on the opposing second side faces of the piezoelectric vibration body with each detecting electrode in each pair being on separate planes opposing each other on opposite faces of the piezoelectric body;
    wherein the piezoelectric vibration body is made to oscillate so that the other end thereof rotates in a circular path, by applying driving currents with phase differentials to each of the driving electrodes; and
    a center of the circular path shifts by a torque operating orthogonally to a rotational central axis of the oscillation;
    a bend of the piezoelectric vibration body, the bend being generated by a the torque being output as information from the detecting electrodes.

2. The piezoelectric gyro element detecting angular velocities of directions of two axes according to claim 1, further comprising fourth driving electrodes formed on the opposing second side faces of the piezoelectric vibration body, by parting the second and the third driving electrodes in the width direction.

3. A piezoelectric gyroscope, comprising:
    the piezoelectric gyro element for detecting angular velocities of directions of two axes according to claim 1;
    a driving circuit for applying a driving signal to each of the driving electrodes of the piezoelectric gyro element; and
    a detecting circuit which detects the output from each of the detecting electrodes.

* * * * *